Aug. 7, 1956 W. H. GILLE 2,758,269
AIRCRAFT CONTROL SERVO SYSTEMS
Filed Aug. 21, 1950

Inventor
WILLIS H. GILLE
By
George H. Fisher
Attorney

United States Patent Office 2,758,269
Patented Aug. 7, 1956

2,758,269

AIRCRAFT CONTROL SERVO SYSTEMS

Willis H. Gille, St. Paul, Minn., assignor to Minneapolis-Honeywell Regulator Company, Minneapolis, Minn., a corporation of Delaware Application August 21, 1950, Serial No. 180,626

9 Claims. (Cl. 318—28)

The invention pertains to motor control or remote positioning systems. More particularly this invention is concerned with the control of an electric motor by a rebalancing system containing a control device and a controlled device driven by the motor which assumes a position corresponding with the position of the control device. Such systems are termed servo mechanisms and such a system becomes operative upon variation in the relative positions of the two devices. In servo systems small error voltage signals control the power of a drive motor. In such systems the stall torque of the electric motor that positions the controlled device may be varied in accordance with an error signal that is a function of the relative positions of the devices.

The stall torque may be varied in accordance with an error signal by a separate motor operated switch means which adjusts the resistance in the electric motor circuit in proportion to the error signal applied to the switch means motor.

The motor switch means assumes a position proportional to the error signal or relative position of control and controlled device. With the error signal applied directly to the motor switch means considerable time is required to position it according to the error signal so that its position is proportional to the error signal.

If we use a sensitive or high gain amplifier between the source of error signal and the motor switch means, we lose the proportional movement of the motor switch means relative to error signal. This is because the switch means in general will be adjusted to the maximum amount even for small error signals as the controlled device is lagged behind the switch means and thus does not reduce the error signal soon enough.

According to this invention a suitable control of the motor operated switch means is effective to remove such time lag and yet maintain proportional control of the stall torque of the servo.

Thus it is an object of this invention to provide an improved arrangement for modulating the stall torque of a servomotor.

It is a further object of this invention to vary the stall torque of an electric servomotor by an improved error signal voltage respnsive motor-operated switch means wherein the power for said electric motor exceeds that supplied by said error signal.

It is a further object of this invention to provide an improved servo system having an electric motor connectable to a separate power source through a motor-operated switch means which itself is controlled from an error signal derived from a separate source.

It is a further object of this invention to decrease the time within which said switch means is positioned in proportion to said error signal.

It is a further object of this invention to control the positioning of said motor operated switch means by a feed-back amplifier in which the position of the switch means is degeneratively fed back to the input of the amplifier.

It is a further object of this invention to obtain modulation of the position of the motor-operated switch means through a feedback amplifier which modulation is substantially independent of the amplification of such amplifier.

It is a further object of this invention to provide a condition responsive device in combination with a novel servomotor for operating a control surface of an aircraft.

Figure 1:
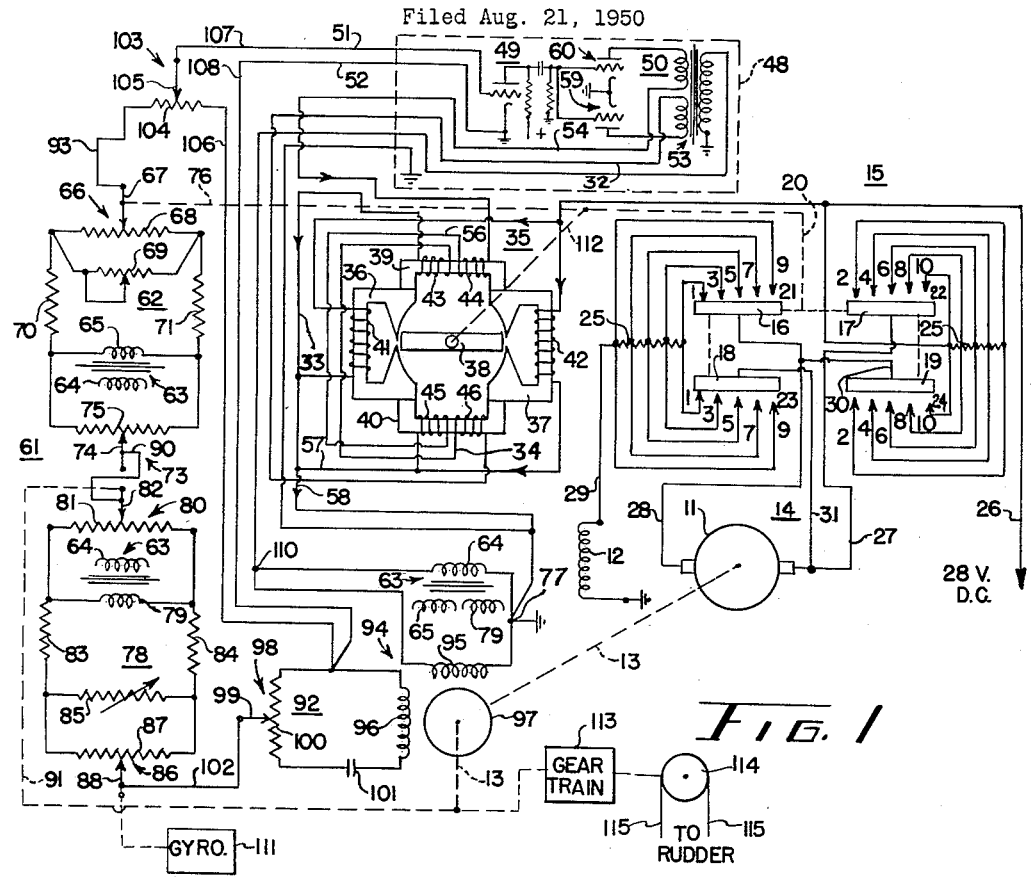
Figure 1 illustrates an alternating current system embodying the invention.

Referring to Figure 1 of the drawing, a servomotor 14 which is of the direct current type has its output torque controlled by a contactor arrangement 15. The contactor arrangement 15 alters the circuit resistance of the motor and is operatively analogous to a plurality of single pole double throw switches. It is reversibly controlled by a polarized actuator 35. The polarized actuator is self biased to a normal position shown but rotates in one or the other of two directions under the control of a discriminator amplifier 48. The discriminator amplifier includes an amplifier section 49 and a discriminator section 50 with the two being connected by a resistor-capacitor coupling. The amplifier section is supplied with input control signals from a balanceable network 61. The balanceable network contains a plurality of signal voltage producing devices comprising a control signal device 86, a servomotor position device 80, a servomotor velocity device 98, an aligning device 73, and a polarized actuator position device 66.

The servomotor 14, as stated, is of the direct current type having an armature 11 which may be reversibly energized and a field winding 12. The motor 14 includes an output shaft 13.

The servomotor switch arrangement 15 comprises a plurality of moveable contactors 16, 17, 18, and 19. The contactors are rigidly connected for joint upward or downward movement obtained from an operating connection 20. The contactors 16, 17 respectively coact with a pair of cooperating sets of yieldable contact elements 21, 22. The contactors 18, 19 coact with a second pair of sets of yieldable contact elements 23, 24. The contact elements 1, 3, 5, 7, and 9 in set 21 are differentially positioned so as to be sequentially engaged by the contactor 16 on movement thereof in the upward direction with the contact element 1 normally engaged by the contactor 16. The contact elements 2, 4, 6, 8, and 10 in set 22 are also differentially positioned and sequentially engaged by the contactor 22 with the contact element 2 normally out of engagement with contactor 17. Similarly, the contact elements 1, 3, 5, 7, and 9 of set 23 are differentially positioned with respect to contactor 18 with contactor 18 engaging contact element 1 at normal position. Also in set 24, contact elements 2, 4, 6, 8 and 10 are differentially positioned with respect to contactor 19 with contact element 2 separated from contactor 19 in normal position of the contactors. The contact elements in sets 23 and 24 are sequentially engaged by the contactors 18 and 19 during downward movement of the contactors.

The corresponding contact elements in sets 21, 23, and the corresponding contact elements of sets 22 and 24 are connected together. Each contact element in a set is connected to its adjacent contact element by a resistor element 25.

A suitable source of supply feeds 28 volts D. C. by means of lead 26 through successively decreasing portions of resistance 25 to the contact elements 2, 4, 6, 8 and 10 of sets 22 and 24. Upon upward movement of the contactors 16, 17, 18, and 19 this voltage is led through a portion of resistor 25, through the sequentially engaged contact element to contactor 17, lead 27, forwardly through armature 11, lead 28, contactor 16, the engaged contact element in set 21, a portion of resistor 25, lead 29, motor field winding 12, to ground, and to the D. C. supply. Similarly, upon downward movement of the contactors 16, 17, 18, and 19 this D. C. voltage is led through a portion of resistor 25, through an engaged contact element in set 24, contactor 19, lead 30, lead 28, to armature 11 in the reverse direction, lead wire 31, contactor 18, the engaged contact element in set 23, resistor 25, lead wire 29, field winding 12, to ground, and to the ground of the D. C. supply. It is thus apparent that various values of resistances are placed in the circuit of the servomotor 10 depending upon the extent of movement given to the contactors 16, 17, 18, and 19.

The polarized actuator 35 comprises two pairs of magnetic field elements and a coacting armature 38. The first pair of magnetic field elements comprise two elements 36 and 37 spaced 180° with reference to the axis of rotation of armature 38. The elements 36 and 37 provide a unidirectional magnetic field and thus may be of the permanent magnet type. However, if desired, the magnetic element 36 may be supplied with an energizing winding 41 connected to the D. C. supply and the magnetic element 37 may be provided with an energizing winding 42 also connected to the D. C. supply.

The magnetic elements 39 and 40 comprising the second pair are displaced ninety degrees from the elements 36 and 37. The magnetic element 39 is provided with two alternating current energized windings 43, 44 and the magnetic element 40 is provided with two alternating current energized windings 45, 46. Windings 43 and 46 comprise one pair and windings 44 and 45 comprise a second pair. These pairs of windings are energized in discriminator manner. The polarized actuator may be thus of the type disclosed in the prior application of Willis Gille, Serial No. 152,053, filed March 27, 1950, and issued February 10, 1953, Patent No. 2,628,272.

The amplifier 48, as stated, comprises an amplifier portion 49 and a discriminator portion 50. The amplifier section 49 may be provided with a desired number of stages of amplification. It is provided with signal input leads 51 and 52 across which is supplied an alternating current signal voltage. A suitable power supply (not shown) supplies the proper plate voltage to the amplifier stages. The amplifier is resistance coupled to the discriminator section 50. A transformer 53 supplies opposite phase alternating voltage to the plates of two tubes 59, 60 in the discriminator section 50. It is thus apparent that one or the other of the discriminator tubes becomes conductive depending upon the phase relationship of the signal voltage across leads 51 and 52 with respect to the voltage on the discriminator tube plates. The output of one discriminator tube 60 extends from lead 54, polarized relay winding 44, lead 56, polarized relay winding 45, lead 57, lead 58 to ground 77. The output of the second discriminator tube 59 traverses lead 32, polarized relay winding 46, lead 34, polarized relay winding 43, lead 33, lead 58, to ground. Thus opposite operation of polarized relay 35 is provided by amplifier 48.

The input voltage supplied across leads 51 and 52 of discriminator amplifier 48 is derived from the balanceable variable impedance network 61. Network 61 comprises a polarized actuator position-centering network 62, a servomotor position-control device network 78, a servomotor velocity network 92, and an overall network potential divider 103.

Network 62 comprises a transformer 63 having a primary winding 64 and a secondary winding 65; a polarized actuator position potentiometer 66 having an adjustable slider 67 and a resistor 68; a variable resistor 69; a fixed resistor 70, a fixed resistor 71; a centering potentiometer 73 having a slider 74 and a resistor 75. Resistor 68 has one end connected through resistor 70 in series to one end of secondary winding 65 and has its opposite end connected through resistor 71 in series with the opposite end of secondary winding 65. Variable resistor 69 is connected across the potentiometer resistor 68. Potentiometer resistor 73 is connected across the ends of secondary winding 65 of transformer 63. The slider 67 of potentiometer 66 is positioned in accordance with the movements of the polarized actuator 35 by suitable operating connection 76. The slider 74 of potentiometer 73 is manually positioned.

Variable impedance network 78 includes a transformer 63 having a primary winding 64 and a secondary winding 79; a servomotor position potentiometer 80 having a resistor 81 and an adjustable slider 82; two fixed resistors 83, 84 and a variable resistor 85, a control device potentiometer 86 having a resistor 87 and a slider 88. Resistor 81 his its ends connected across the ends of secondary winding 79. Resistor 87 has one end connected through resistor 83 in series to one end of secondary winding 79 and has its opposite end connected through resistor 84 in series to the opposite end of secondary winding 79. Variable resistor 85 is connected across the control device resistor 87. A lead wire 90 extends from slider 74 of the centering potentiometer 73 to the slider 82 of the servomotor position potentiometer 80. Slider 82 is positioned from the output shaft 13 of the servomotor 14 through a suitable operating connection 91. The slider 88 of control device potentiometer 86 is positioned by an initiating controller which may be a condition responsive device such as a gyroscope 111 mounted in an aircraft and which senses the change in attitude of the aircraft with respect to a particular axis thereof.

Network 92 comprises a dynamic transformer 94 and a voltage divider potentiometer 98. The transformer 94 includes a primary winding 95 and a secondary winding 96 inductively associated therewith by a rotor 97. The arrangement is such that the voltage induced in the secondary winding 96 from the primary winding 95 depends upon the speed of rotation of the rotor 97 which is driven from the output shaft 13 of the servomotor 14. The potentiometer 98 includes a manually operable slider 99 and a resistor 100. One end of resistor 100 is connected to an end of secondary winding 96 and the opposite end of resistor 100 is connected through a phasing condenser 101 to the opposite end of secondary winding 96. The manually adjustable slider 99 is connected to slider 88 of the control device potentiometer 86 by a lead wire 102.

The overall network voltage dividing potentiometer 103 includes a resistor 104 and an adjustable tap 105. One end of resistor 104 is connected by a lead wire 93 to slider 67 of the polarized relay position potentiometer 66, and a lead wire 106 connects the opposite end of resistor 104 to one end of resistor 100 of the voltage dividing potentiometer 98. A lead wire 107 connects the amplifier input lead 51 and slider 105 of the overall voltage divider 103 and a lead wire 108 connects the amplifier input lead 52 to the junction of resistor 100 and lead 106.

The arrangement is completed by connecting the primary winding of transformer 53 in amplifier-discriminator 48; the primary winding 95 of the velocity generator transformer 94; and the primary winding 64 of the impedance network transformer 63 in parallel across the alternating voltage supply terminals 110, 77.

In the operation of the system, the servomotor 14 is assumed to be in a normal position as shown. The network 61 is moreover assumed to be in a balanced condition with no signal voltage applied to leads 51 and 52 of amplifier-discriminator 48. If such signal exists, the centering potentiometer slider 74 may be adjusted to provide a no signal condition on the amplifier-discriminator. If the gyroscope 111 operates slider 88 of the control device potentiometer 86 the network 61 becomes unbalanced. A voltage is applied across amplifier-discriminator leads 51, 52 which voltage is amplified in the amplifier portion 49 and applied to the discriminator portion 50. One or the other of tubes 59, 60 in discriminator portion 50 operates depending upon the phase relationship of the input voltage signal with respect to the voltage across the primary winding of transformer 53 in the discriminator. One or the other of the pairs of polarized actuator relay windings 43, 46 or 44, 45 will be energized. Upon this energization, the rotor 38 of the polarized relay 35 rotates in proportion to the extent of unbalance of network 61 and by its operating shaft 112 adjusts the operating means 20 for the contactors 16, 17, 18 and 19 in switch arrangement 15. Simultaneously, the operating shaft 112 drives the operating means 76 for slider 67 to exert a preliminary rebalancing effect on network 61.

The positioning of the contactors in the switch arrangement 15 energizes the servomotor 14 which positions the load device such as a rudder (not shown) driven by cables 115 from cable drum 114 driven through gear train 113 from motor shaft 13 to correct the condition. Motor 14 also through its operating shaft 13 drives the slider 82 of the servomotor position potentiometer 80 through the operating connection 91. The servomotor also drives the rotor 97 of the velocity generator 94 to apply a velocity signal across the resistor 100 from which a desired portion is tapped off by the adjustment of slider 99 and applied to network 61. As the signal voltage across amplifier input leads 51 and 52 decreases as the network 61 becomes balanced, the output of the discriminator tube 60 or 61 also decreases. The windings on the polarized actuator 35 have their energization decreased and the rotor 38 thereof moves toward its normal position shown thereby also moving the slider 67 of the actuator position potentiometer 66 back to a normal position. When the impedance network 61 reaches a steady state condition, the signal from the control device potentiometer 86 is balanced from the signal from the servomotor position potentiometer 80 consequently the motor 14 has rotated a distance proportional to the adjustment of the control potentiometer slider 88. The actuator position slider 67 is at its normal position and with the servomotor 14 no longer rotating no signal is obtained from the velocity generator network 92.

Should it be desired, the variable resistor 85 may be adjusted to vary the voltage drop across resistor 87 of the control potentiometer 86. By this adjustment, the amount of movement required of slider 82 of the servomotor position potentiometer 80 to balance the movement of slider 88 of the control device potentiometer 86 may be varied and thus the amount of servomotor movement for a change in a condition may be altered.

The variable resistor 69 may be adjusted to alter the effect of the polarized actuator position potentiometer 66 in the network 61. The variable resistor 69 may be adjusted until no effect is obtained from potentiometer 66 irrespective of the adjustment of slider 67. With such adjustment of resistor 69, and using a low gain amplifier, the maximum signal from the control device potentiometer 86 may cause operation of the polarized actuator 35 and the adjustment of contactors in the switch arrangement 15 so that the contactor 16 for example engages its last contact 9. Also a small signal or adjustment of the control device potentiometer 86 may cause the contactor 17 to engage its first contact element 2. Thus a modulation in the position of the actuator 35 in accordance with various input signals is obtained. However, with a low gain amplifier, the energization of the windings of the polarized relay 35 is small so that the torque output operating on the rotor 38 is small which results in a considerable time lag in the positioning of the contactors in the switch arrangement 15.

If the gain of the amplifier section be increased or a high gain amplifier be used, the operating point on the tube characteristic of the amplifier may be so high that very little control signal is required additionally, for example, to cause the tube to pass sufficient current to cause full energization of the polarized relay. In such event, the output of the discriminator tubes 60 or 61 will have the same effect on the polarized relay for large as well as small input control signals. Consequently the polarized actuator armature 38 would be fully adjusted or to the same extent irrespective of the amount of the input signal from the control potentiometer 86. Moreover, while an increased output from the high gain amplifier results in a heavier energization of the windings of the polarized actuator 35 and thus a more rapid adjustment of the contactors in the switch arrangement 15 the modulation in the position of the contactors in the switch arrangement 15 in proportion to various input signals from control potentiometer 86 is destroyed.

With the variable resistor 69 adjusted so that its full resistance is obtained, the effect of potentiometer 66 is at its maximum. With a high gain amplifier provided, a small signal from the control potentiometer 86 will as previously indicated cause a heavy energization of the windings in the polarized relay 35. However, while this heavy energization causes a greater torque on the rotor 38 of the polarized actuator relay 35 and therefore more rapid rate of movement, this movement of the actuator rotor results in an adjustment immediately of slider 67 of the polarized actuator position potentiometer 66. The input circuit to the amplifier 49 is thus provided with an immediate preliminary rebalance voltage. Thus the position assumed by armature 38 of the polarized relay 35 although more rapid than with a low gain amplifier is limited by the polarized actuator position potentiometer 66.

It will therefore now be appreciated that we have decreased the time lag of response of the actuator 35 for given control input signals from potentiometer 86 by permitting increased energization of the windings of the actuator while retaining the modulation in the position desired.

Figure 2:
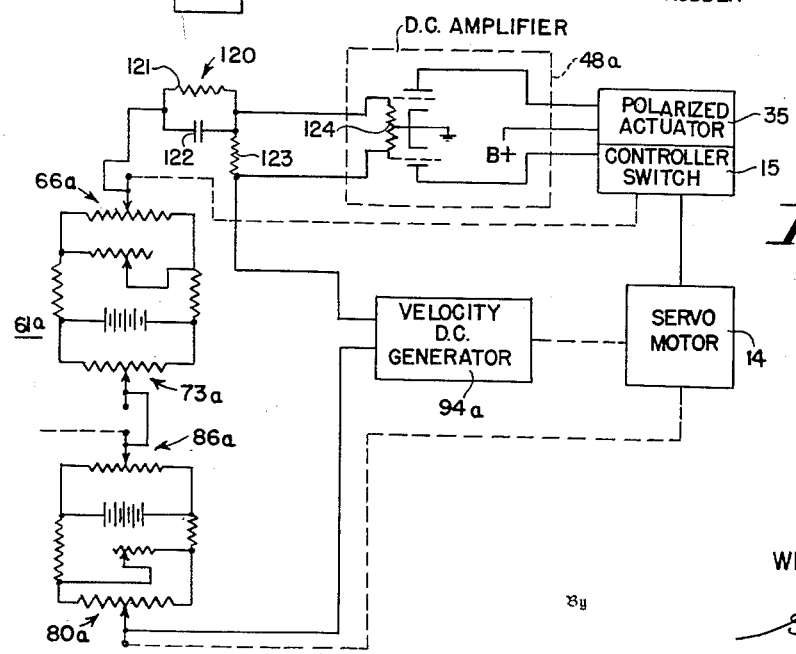
Figure 2 illustrates a direct current system embodying the invention.

A direct current embodiment of the servo system is shown in Figure 2 which has in general components which correspond with the A. C. system of Figure 1. The servomotor 14 in Figure 2 has its torque controlled by a controller switch arrangement 15 which is adjusted in accordance with the energization of a polarized actuator 35. The servomotor, controller switch or switch arrangement 15, and polarized actuator 35 are identical with the corresponding elements in Figure 1. The polarized actuator is operated from the output of a D. C. amplifier 48A. The control signal for the D. C. amplifier is obtained from a balanceable network 61A which includes a polarized actuator position potentiometer 66A; a centering potentiometer 73A; a condition responsive potentiometer 86A; a servomotor position potentiometer 80A. In series with this balanceable network 61A is a direct current velocity generator 94A. Across the combined output of the balanceable network 61A and the velocity generator 94A is connected a basic lead controller 120.

The basic lead controller consists of a resistor 121 and a capacitor 122 connected in parallel with the parallel arrangement connected in series with a second resistor 123. The output of the lead controller 120 appears across the resistor 123 and includes a displacement and a rate component of the voltage derived from network 61A and velocity generator 94A. The opposite ends of resistor 123 are connected to two control grids of a double triode in D. C. amplifier 48A. The control grids are connected to a cathode of the double triode by a dropping resistor 124, and it is thus apparent that signals of opposite polarity are applied to the two control grids in response to a given input signal. The provision of the lead controller 120 in the D. C. arrangement of Figure 2 increases the stability of the system by tending to reduce the trend of the system to produce self oscillations at certain frequencies in the adjustment of the control potentiometer 86A.

It is now apparent that there has been provided an improved servo system wherein a balanceable control circuit controls differentially a power circuit so that the output torque of the servomotor is adjusted in accordance with a value of a control signal and further that such modulation or differential control in the output torque of the servomotor in accordance with the magnitude of the control signal is obtained with slight lag of motor operation to signal inception.

While various alternative embodiments of the invention may now suggest themselves to those skilled in the art, it is desired that the invention be not limited to the precise embodiment described but as defined by the following claims.

I claim as my invention:

1. In a control system in combination: a source of alternating control voltage whose phase and magnitude varies with a controlling condition; a servomotor; a source of alternating voltage operated by said servomotor; a centrally biased reversibly operable motor switch means having an energizable winding to effect change in its position to variably energize the servomotor for differentially controlling the stall torque of said servomotor; a source of alternating voltage driven by said motor switch means; voltage combining means connected to said three sources of alternating voltage; and voltage responsive means connected to said combining means and said winding for controlling the direction and extent of operation of said switch means in proportion to a resultant of said combined voltages.

2. In a balanceable control system for a servomotor having means for producing an operation initiating control signal voltage corresponding to a desired operated position of said servomotor, in combination: a feedback amplifier, a motor operated switch means positionable various extents and connectible to a source of power for controlling the amount of power applied to said servomotor and connected for operation to said amplifier, means for applying said control signal voltage to said amplifier; means for producing an additional signal voltage on said amplifier proportional to the operation of said motor operated switch means, and means operated by said servomotor for applying a second additional signal voltage to said amplifier, said motor operated switch means being positioned according to the summation of said signal voltages.

3. A servo system comprising: a servomotor; means for producing an operation initiating voltage signal proportional to variation from a desired condition; an electronic amplifier having an amplification factor greater than one; a switch means operated by the amplifier and adjusted extents proportional in accordance with the output of said amplifier; a control circuit for said servomotor whose impedance is varied in accordance with said proportional switch means adjustment; a voltage produced in accordance with the extent of said switch means adjustment; means for producing a voltage proportional to the speed of motion of said servomotor; and means for combining said three voltages and connected to said amplifier.

4. A servo system comprising: a variable torque servomotor; a control device for producing a variable signal voltage; a controlled device for producing a variable rebalancing voltage and driven by said servomotor; an electronic amplifier having an amplification factor greater than one; a normal-position biased motor operated switch means controlled by said amplifier output and varying the power supplied to and hence the torque of said servomotor in accordance with said amplifier output; a variable feedback voltage signal device responsive to operation of said motor switch means, and means for combining said three voltages with the rebalance voltage and feedback voltage opposing the control device voltage and connected to provide the input to said amplifier.

5. A servo system comprising: a directional gyroscope; a servomotor; a control device operated by said gyroscope for producing a signal voltage; a controlled device for producing a rebalancing voltage and driven by said servomotor; an electronic amplifier having an amplification factor greater than one; a normal-position biased motor operated switch means controlled by said amplifier output and varying the magnitude of the torque of said servomotor in accordance with said output; a feedback voltage signal device responsive to operation of said motor switch means, means for combining said three voltages and connected to provide the input to said amplifier; and means adapted to position a rudder of an aircraft and driven by said servomotor.

6. In a balanceable motor control system in combination: a first variable source of control voltage, an oscillatable motor; means operable by said motor in one or another direction with each operation being of adjustable extent; a second variable control voltage source; variable power control means having a magnitude of output varying with its adjustment; means for driving said second voltage source and said variable power control means by said motor operable means; a servomotor connected for operation to the variable power control means; a third variable voltage source adjusted by said servomotor; and means for combining said three voltages and operating said motor an extent proportional to the sum of the combined voltages.

7. A balanceable motor control system comprising: an operable control device, a controlled device, a servomotor for positioning said controlled device, self-biasing motor control means having a normal biased position for controlling differentially the magnitude of power applied to said servomotor in accordance with its departure from the normal position to thereby control the motor output, a device positioned by said biased motor control means, and further means controlled by operation of said three devices and connected to said motor control means and effecting differential operation thereof in proportion to the resultant operation of said devices, the operation of the motor control means and servomotor opposing the operation of the control device.

8. A motor control system comprising: a variable magnitude control voltage providing device; a voltage responsive device; an oscillatable motor control means biased to a normal position and differentially operated variable extents by said voltage responsive device; a servomotor; means controlled by said motor control means for differentially varying the magnitude of energization of the servomotor in accordance with the control means displacement; a variable magnitude voltage providing device driven by said motor control means; a variable magnitude voltage providing device driven by said servomotor; and means connecting said three variable voltage providing devices in electrical series relationship with the latter two voltages opposing the former for combining said voltages, and connected to said voltage responsive means for operation thereof.

9. In a servo system: a source of alternating control voltage variable in phase in accordance with the direction of change in a controlling condition; a servomotor; voltage amplifying means; rotary switching means having biasing windings connected to a source of power and operating windings reversely energized by said amplifying means in accordance with the phase of the voltage applied thereto said switching means being connected to and reversibly controlling said servomotor; a source of voltage operated by said rotary switching means the phase of which varies with the direction of operation of the switch means; and means for combining said voltages and connected to said voltage amplifying means.

References Cited in the file of this patent

UNITED STATES PATENTS

| | | |
|---|---|---|
| 2,079,497 | Wilhjelm | May 4, 1937 |
| 2,267,681 | Fairchild | Dec. 23, 1941 |
| 2,313,079 | Lilja | Mar. 9, 1943 |
| 2,389,939 | Sparrow | Nov. 27, 1945 |
| 2,509,295 | Glass | May 30, 1950 |
| 2,582,305 | Young | Jan. 15, 1952 |